(12) United States Patent
Nelson et al.

(10) Patent No.: US 9,637,043 B2
(45) Date of Patent: May 2, 2017

(54) BALE STRAPPING APPARATUS

(71) Applicants: Bruce Edward Nelson, Emmetsburg, IA (US); Chad Warren Anderson, Emmetsburg, IA (US); Jonathan David Tesch, Watertown, SD (US)

(72) Inventors: Bruce Edward Nelson, Emmetsburg, IA (US); Chad Warren Anderson, Emmetsburg, IA (US); Jonathan David Tesch, Watertown, SD (US)

(*) Notice: Subject to any disclaimer, the term of this patent is extended or adjusted under 35 U.S.C. 154(b) by 0 days.

(21) Appl. No.: 14/570,047

(22) Filed: Dec. 15, 2014

(65) Prior Publication Data

US 2016/0167563 A1    Jun. 16, 2016

(51) Int. Cl.
*B60P 7/08* (2006.01)
*B60P 7/12* (2006.01)
*A01D 90/08* (2006.01)

(52) U.S. Cl.
CPC ............. *B60P 7/12* (2013.01); *A01D 90/083* (2013.01); *B60P 7/0823* (2013.01); *B60P 7/0876* (2013.01)

(58) Field of Classification Search
CPC .......... B60P 7/12; B60P 7/0823; B60P 7/0807
USPC ....... 410/32, 34, 97, 98, 100; 414/111, 24.5; 248/499
See application file for complete search history.

(56) References Cited

U.S. PATENT DOCUMENTS

| | | | |
|---|---|---|---|
| 3,740,073 A * | 6/1973 | Schwiebert | B60P 7/12 410/103 |
| 4,576,531 A * | 3/1986 | Cosnet | B60P 7/12 410/100 |
| 4,673,208 A | 6/1987 | Tsukamoto | |
| 5,460,465 A * | 10/1995 | Little | B60P 7/083 410/100 |
| 5,954,465 A * | 9/1999 | Ellerbush | B60P 7/12 410/47 |
| 6,237,985 B1 | 5/2001 | O'Brian | |
| 6,499,790 B1 | 12/2002 | Johnston | |
| 6,698,817 B1 | 3/2004 | O'Brian | |
| 6,974,176 B2 | 12/2005 | Smith et al. | |
| 7,044,700 B2 | 5/2006 | Tessier et al. | |
| 7,189,042 B1 | 3/2007 | Schmit | |
| 7,866,925 B1 | 1/2011 | Matlack et al. | |
| 8,272,676 B2 | 9/2012 | Bremer | |
| 8,641,123 B1 | 2/2014 | Royer | |

OTHER PUBLICATIONS

A-Series Dump Tarp Cover with Hydraulic Pivoting Arm System; dated Jun. 16, 2014; http://www.loadcoveringsolutions.com/a-serieshydraulicpivotingarmdumptarpcover.com; Load Covering Solutions Ltd. Canada.

* cited by examiner

*Primary Examiner* — Stephen Gordon
(74) *Attorney, Agent, or Firm* — Brick Gentry PC; Brian J. Laurenzo; Jessica L. Susie

(57) ABSTRACT

A bale strapping apparatus is provided. The apparatus may include a floor to receive at least one bale of material, a bar, and means for moving the bar. The bar may include at least one dispenser for receiving and dispensing securing members. The securing members may be permanently attached to the dispenser. Furthermore, the bar may be moved laterally above and across the floor and, accordingly, over the at least one bale of material, thereby causing the dispenser to dispense the securing member around the at least one bale. The apparatus may then tighten the securing members, thus securing the bale to the apparatus.

8 Claims, 13 Drawing Sheets

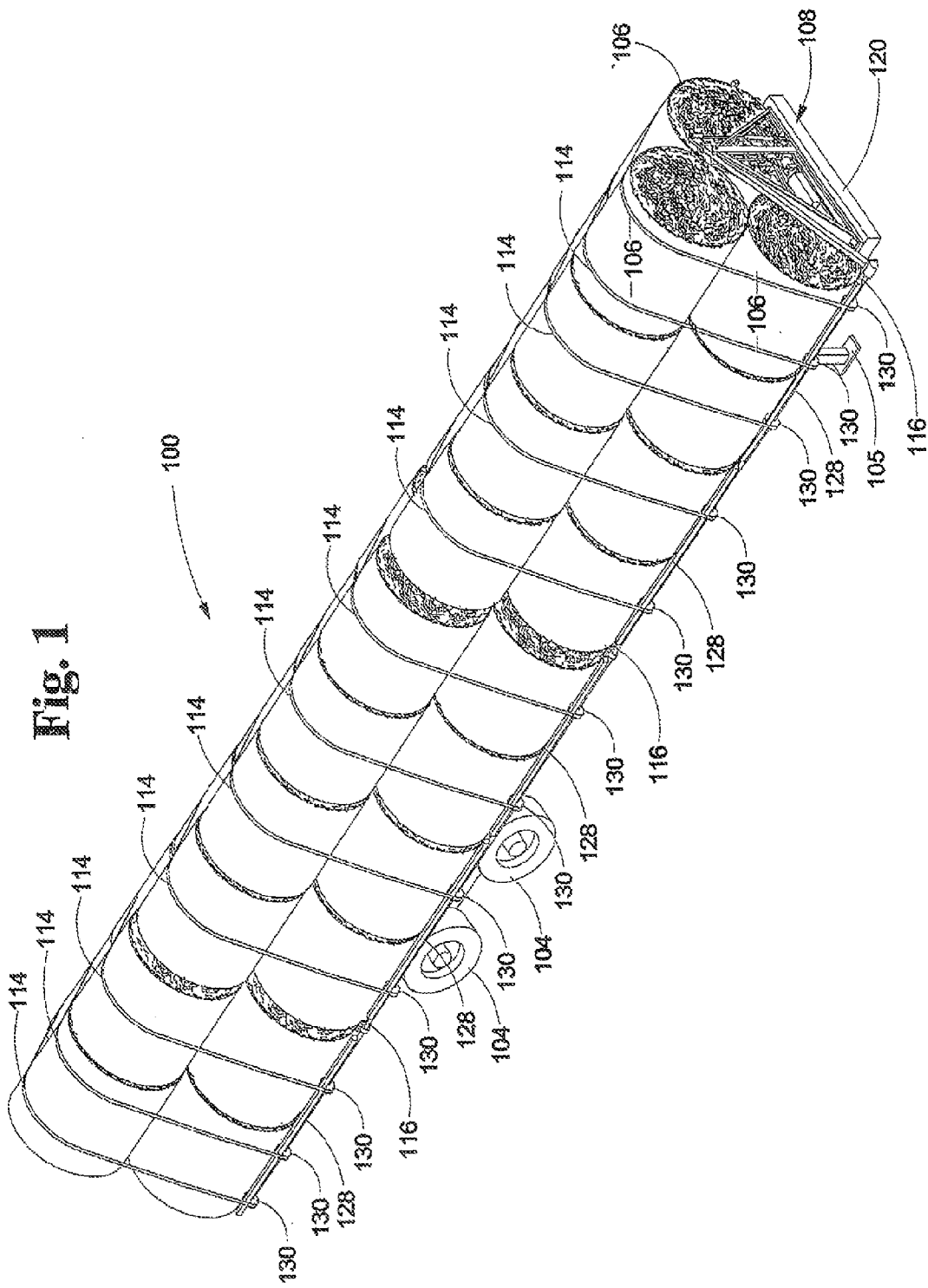

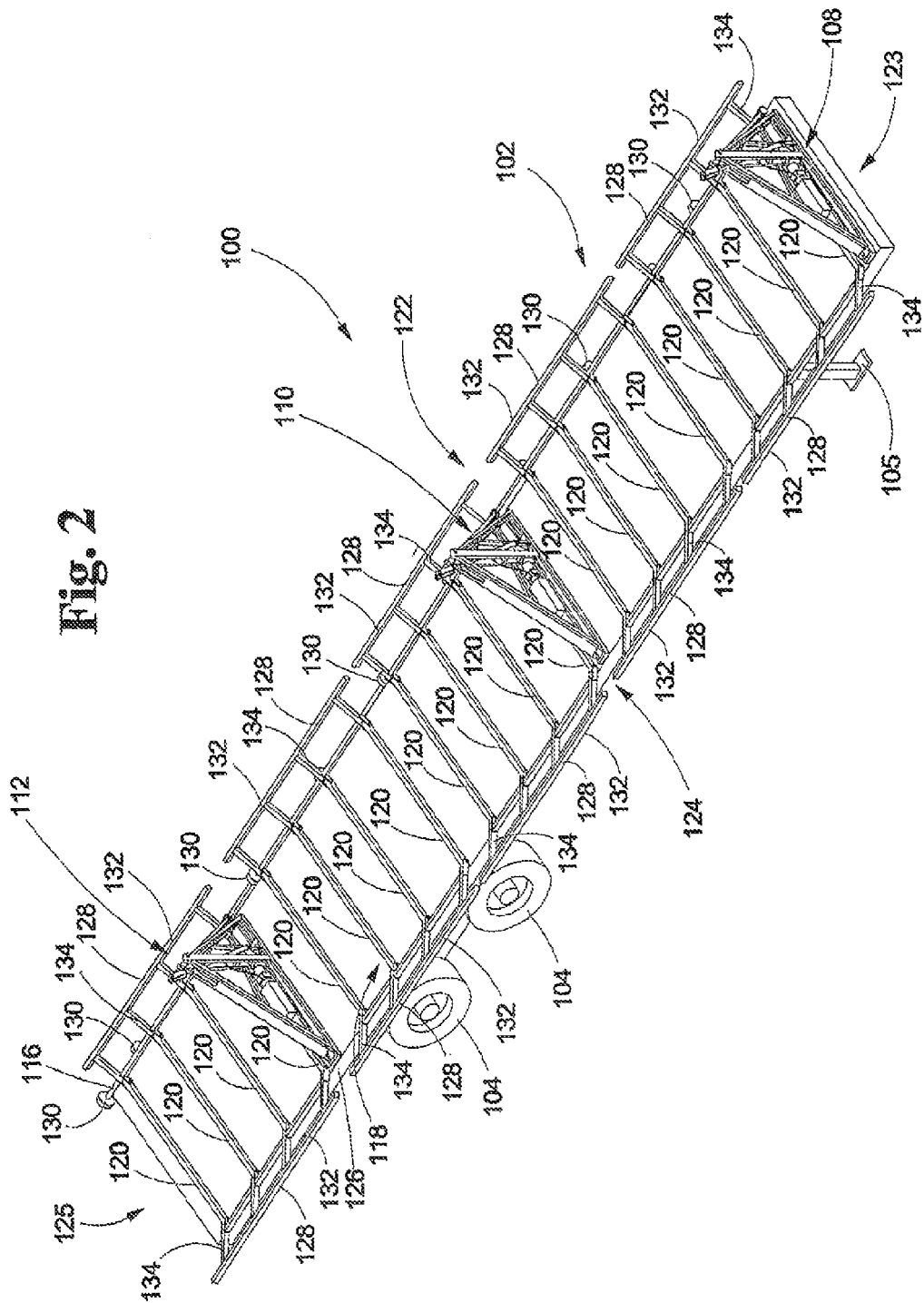

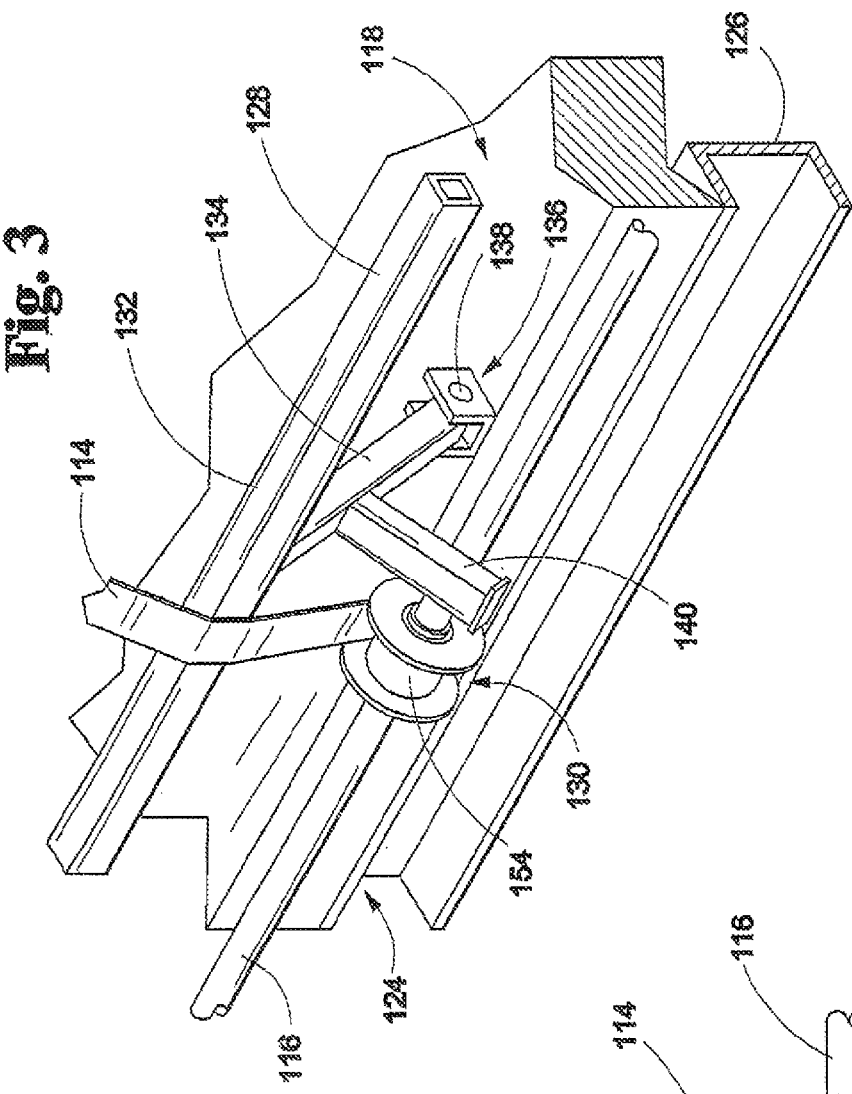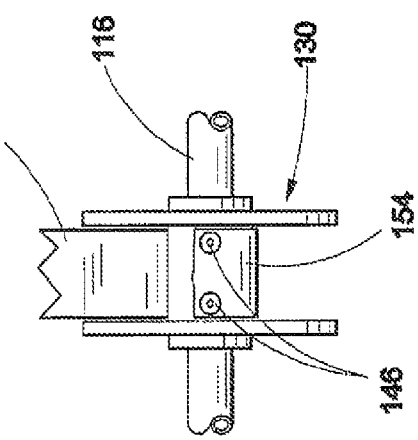

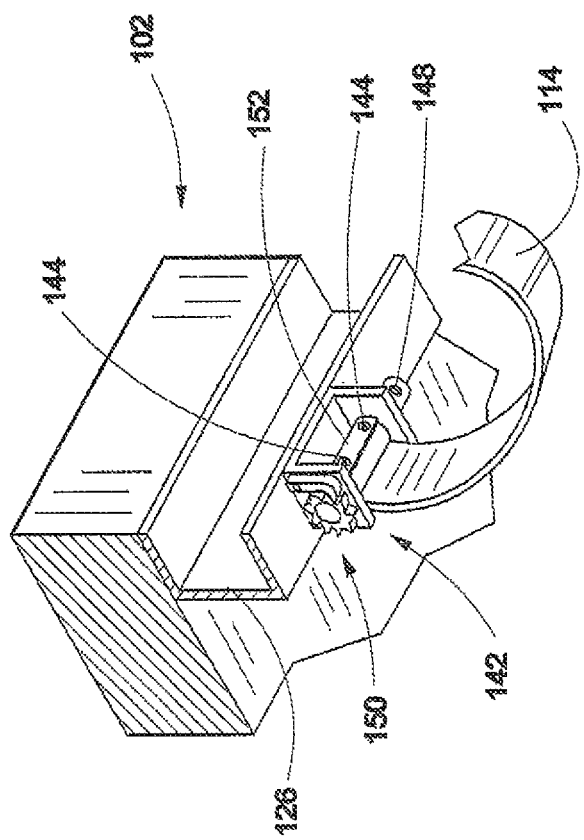

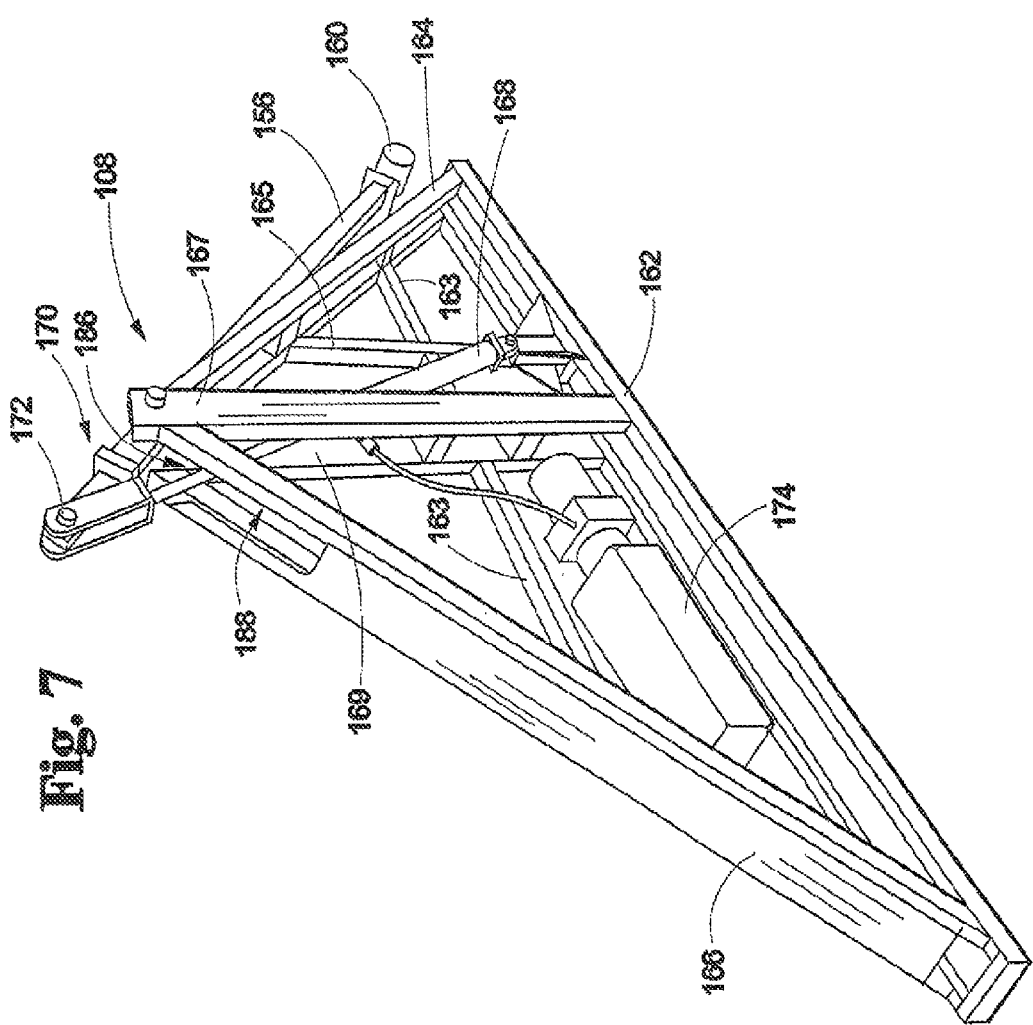

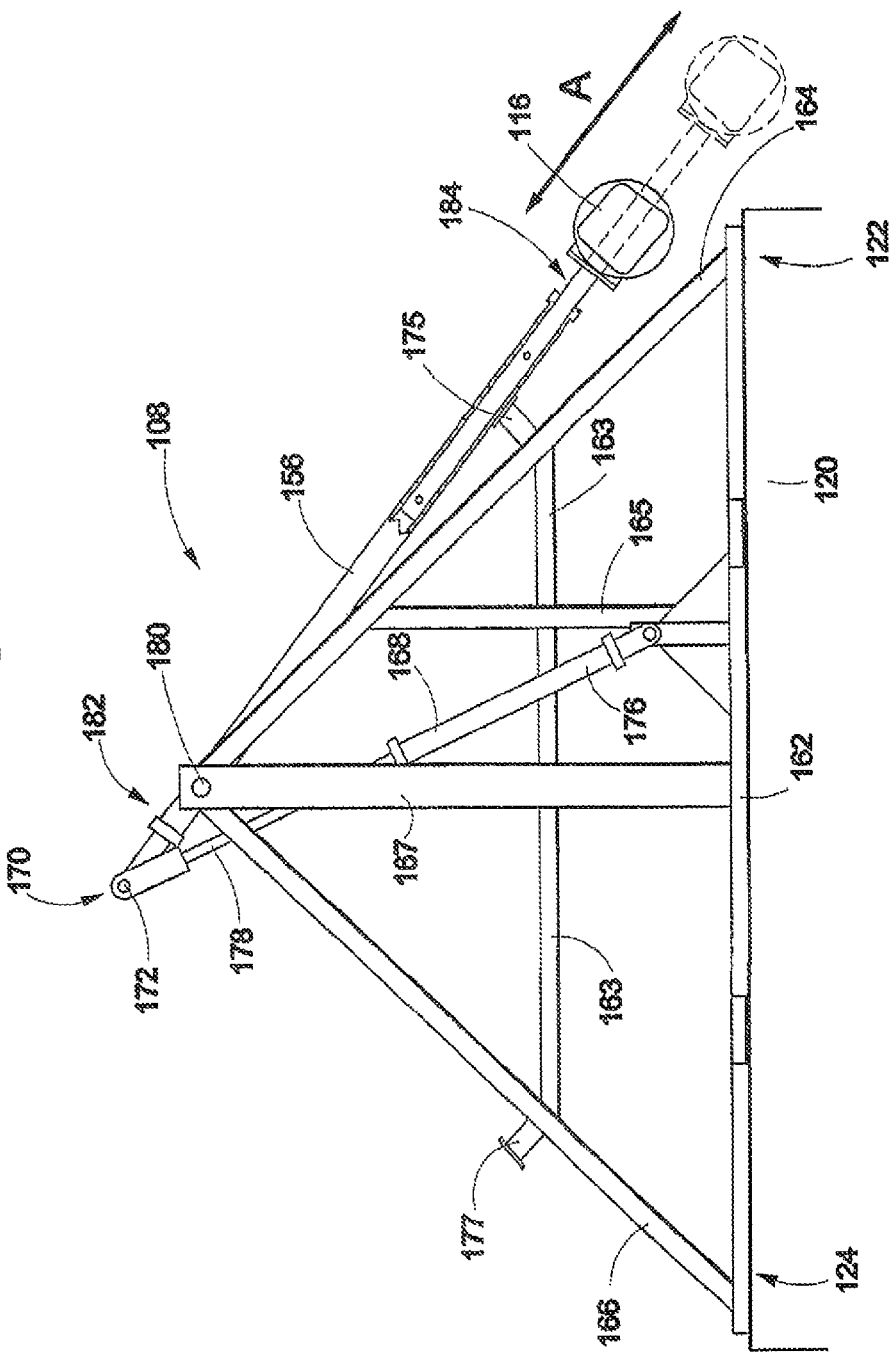

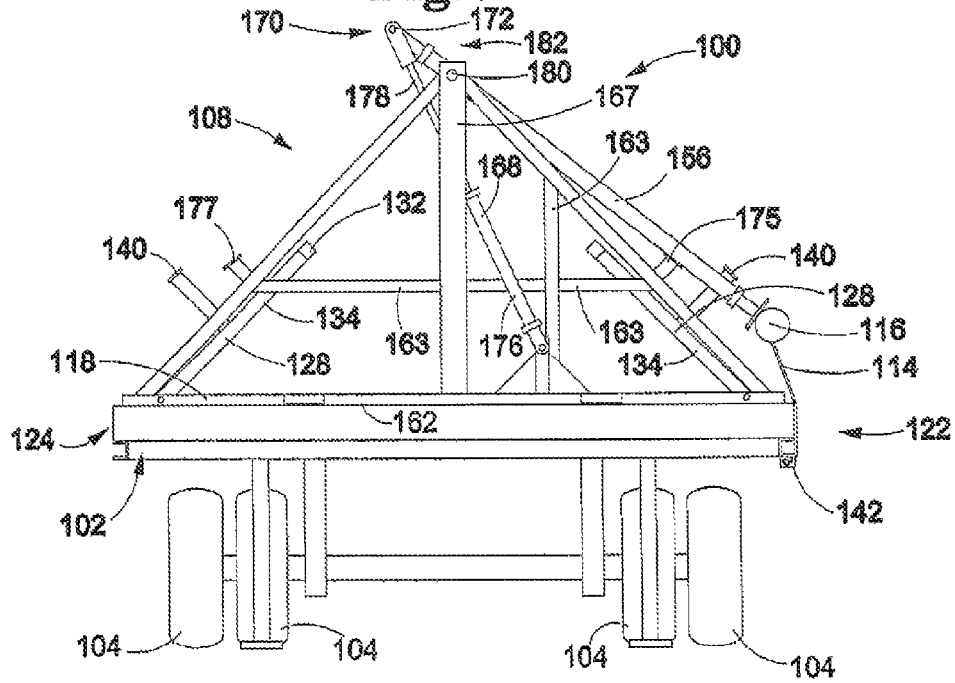
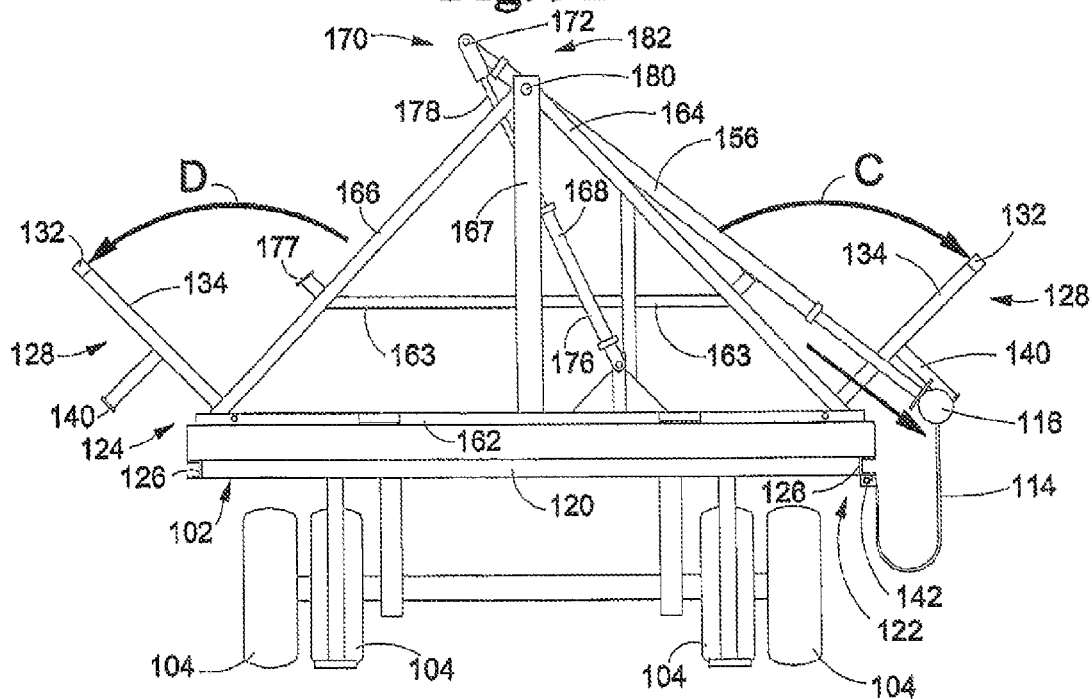

BALE STRAPPING APPARATUS

FIELD OF THE INVENTION

The present invention relates to agricultural equipment used in the transport of agricultural products. More specifically, the present invention relates to a bale strapping apparatus for automatically securing bales of material to a transport device.

BACKGROUND

Transportation of large bales of material in the agricultural industry is a difficult and time consuming process. In particular, securing bales of material to a transport device, such as a trailer, is time consuming and requires physically intense labor. Most often, bales are secured to a trailer by straps. Previous methods of securing the straps to the trailer include loading the bales on the trailer, manually attaching the straps to one side of the trailer, manually throwing or otherwise placing the straps over the bales, securing the straps to the opposite side of the bales, and tightening the straps to secure the bales to the trailer. Such a process can take forty-five minutes or more, as well as strenuous manual labor. Accordingly, transporting large bales is a difficult task.

Attempts have been made to automate parts of this process; however, they all have drawbacks. In addition, devices of the prior art do not go far enough in automating the process. For example, U.S. Pat. No. 6,499,790 is directed to a covering system for a trailer and method of using same. The disclosed trailer employs a roller which may be positioned to the first side of a trailer. Straps may then be removably attached to a roller, which places the straps across the bales. The straps are then detached from the roller and secured to the trailer. The trailer and method of U.S. Pat. No. 6,499,790 have drawbacks. The user must manually attach the straps to the roller, the primary purpose of which is to position a cover over the bales. Furthermore, the user must manually detach the straps from the roller and secure same to the trailer, thus securing the bales to the trailer. Therefore, the straps are temporarily attached to the roller rather than permanently attached.

Another reference, U.S. Pat. No. 7,044,700 discloses a system and method for strapping a load. The system includes two rollers which are parallel to each other and supported by a frame. In the open position, the rollers are located in an upright position near the top center of the trailer. Strapping is secured on each of the rollers to span between the roller and the lower side of the trailer. Once bales are in place on the trailer, the user manually unrolls the strapping from the roller using a crank and ratchet mechanism. The invention disclosed in U.S. Pat. No. 7,044,700 has deficiencies. In particular, a user must still manually unroll and secure the straps to safely secure the bales to the trailer for transport.

Yet another reference, U.S. Pat. No. 7,189,042 discloses a bale transport system wherein straps are attached to opposite ends of a cover that is positioned by a set of two rollers. The straps are positioned via spools. As the cover is unrolled to the closed position, the bale straps are also dispensed from the spools.

U.S. Pat. No. 7,866,925 discloses an assembly for securing cargo upon a load bed. The assembly includes two tie support arms, one in the front of the trailer and one in the rear. The tie support arms are connected via two parallel, longitudinally extending straps, or ties. The tie support arms may move downward to secure bales or upward for loading and unloading of the bales. Once all bales and crossbars are in place, the ties are moved downward to secure the bales and crossbars. U.S. Pat. No. 7,866,925 does not disclose a bale strapping apparatus wherein straps are laterally positioned over the bales. Rather the reference discloses an apparatus wherein straps are longitudinally positioned over the bales, which is a less safe configuration. Accordingly, U.S. Pat. No. 7,866,925 also has deficiencies.

Accordingly, there is a need in the art for a bale strapping apparatus wherein the straps are permanently attached the trailer and automatically positioned over the bales to be transported. Furthermore, the apparatus should position the straps laterally across the bales for transportation. Such an apparatus may include means to automatically tighten the straps across the bales, further securing the load for transport. Such an apparatus should preferably keep the entire space above the trailer open for convenient loading and unloading. Other objects and advantages of the invention will be apparent from the drawings and detailed description to follow.

SUMMARY

In one embodiment of the invention, a bale strapping apparatus is disclosed. The bale strapping apparatus may include a floor receiving at least one bale of material. Further, a bar having a least one dispenser may be included. The dispenser may dispense a securing member which may be permanently attached to the dispenser. Also included may be means for moving the bar such that it travels laterally above and across the floor and over at least one bale of material, thereby causing the dispenser to dispense the securing member around the at least one bale.

The dispenser of the bale strapping apparatus may include a roller which is capable of dispensing and receiving securing members. Further, the bale strapping apparatus may include a plurality of rollers for dispensing and receiving a plurality of securing members. The securing members may be straps. The bale strapping apparatus may further include at least one tightening means, which may include at least one telescoping member. Moreover, the tightening means may include means for actuating the rollers to receive the securing members. The bale strapping apparatus may further include a hydraulic motor for moving the bar.

In another embodiment of the invention, a bale strapping apparatus is disclosed including a trailer having a floor which receives at least one bale of material, with the floor having first and second ends and first and second sides. The bale strapping apparatus further includes a self-strapping assembly including a bar having a plurality of dispensers. The plurality of dispensers each dispenses a securing member which is each permanently attached to the dispenser which dispenses it. The bale strapping apparatus may further include means for moving the bar from an open position to a closed position. The bar may be near the first floor side in the open position and near the second floor side in the closed position. Furthermore, the plurality of securing members may be in a dispensed position in the closed bar position.

Moreover, the bale strapping apparatus may include at least one tightening means. The plurality of securing members may include a storage position wherein the securing members are not dispensed and a tightened position. A tightening means may activate the securing members to move between the dispensed position and the tightened position. A bale may be secured to the trailer when the securing members are in the tightened position. The tightening means may include at least one telescoping member for moving the bar. In addition, the bale strapping apparatus may include means for activating the dispensers to receive the securing members, thus moving the securing members between the dispensed and tightened positions.

In yet another embodiment, a bale strapping apparatus is providing including a trailer having a floor. The floor includes first and second sides, as well as first and second ends. The floor includes a longitudinal direction extending between the first and second ends and a lateral direction extending between the first and second sides. The floor may receive at least one bale of material. A self-strapping assembly may include a plurality of rollers which dispense a plurality of straps, with the straps each permanently attached the roller dispensing the strap. The bale strapping apparatus may further include means for moving the bar from the floor first side to the floor second side, with the plurality of rollers dispensing the plurality of straps as the bar moves from the floor first side to the floor second side, thereby positioning the straps across the floor lateral direction. In addition, the means for moving the bar may include at least one motor for activating movement. The bale strapping apparatus may further include at least one tightening means for tightening the straps, thereby securing the at least one bale of material on the trailer.

BRIEF DESCRIPTION OF THE DRAWINGS

FIG. 1 is a perspective view of an embodiment of a bale strapping apparatus of the present invention wherein the apparatus is holding a load of round bales.

FIG. 2 is a perspective view of the bale strapping apparatus of FIG. 1 wherein the apparatus is empty.

FIG. 3 is perspective view of a dispenser and portion of a bar of the bale strapping apparatus of FIG. 1.

FIG. 4 is an elevation view of the dispenser of FIG. 3 showing the attachment of a securing member to the dispenser.

FIG. 5 is a perspective view of a securing member of the bale strapping apparatus of FIG. 1 attached to the underside of the trailer.

FIG. 7 is a perspective view of the hydraulic levers and frame of the bale strapping apparatus of FIG. 1.

FIG. 8 is an elevation view of the hydraulic levers and frame of FIG. 7 showing the telescoping movement of the telescoping arm of the bale strapping apparatus of FIG. 1.

FIG. 9A is an elevation view of the bale strapping apparatus of FIG. 1 showing the side rails of the apparatus in the closed position.

FIG. 9B is an elevation view of the bale strapping apparatus of FIG. 1 showing the side rails of the bale strapping apparatus in the open position.

DETAILED DESCRIPTION

Figure 6:
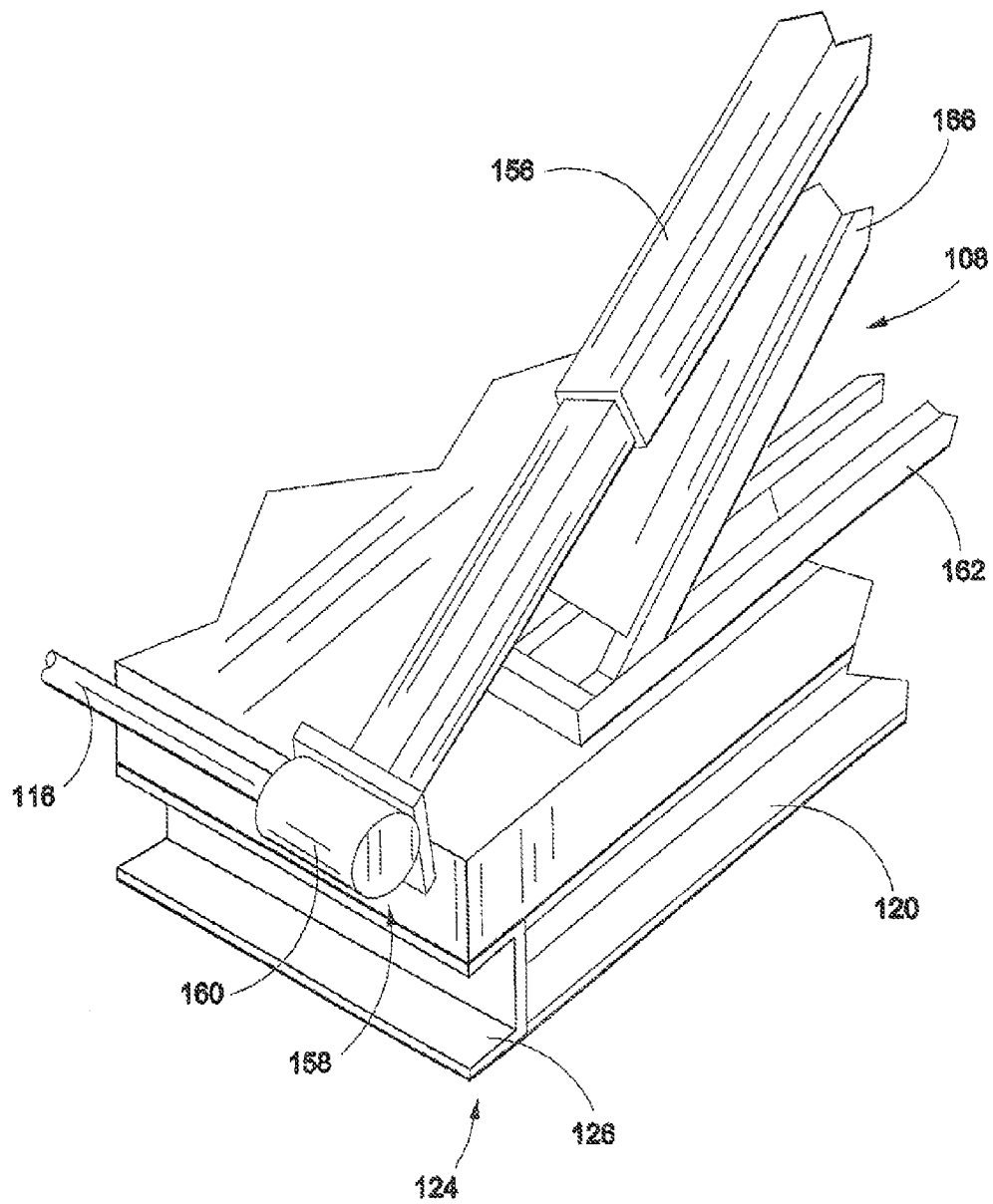
FIG. 6 is a perspective view of the telescoping arm of the bale strapping apparatus of FIG. 1.

The following is a detailed description of an embodiment of a bale strapping apparatus 100 (sometimes "apparatus") of the present invention. For ease of discussion and understanding, the following detailed description and illustrations often refer to a bale strapping apparatus for use with large round bales of stover material. As is known in the art stover material may include stalks and leaves of plants such as corn, as well as other course roughage from the plant. It should be appreciated that the apparatus 100 may also be used to transport bales of other shapes, as well as of other types of material, including hay and straw. In one example the stover or other material may be used as feedstock for a cellulosic ethanol plant. In another example, the stover or other material may be used for livestock feed.

Turning to FIG. 1, the apparatus may include a trailer 102 supported by wheels 104. The trailer 102 may be pulled by a vehicle such as a tractor, semi-tractor, or other type of vehicle. In the preferred embodiment, the trailer 102 is pulled by a semi-tractor (not shown). The trailer may be any type known in the art, now or in the future, including a flatbed or drop deck trailer. In one embodiment, the trailer may be fifty-three feet long. As the semi-tractor is not shown in FIG. 1, a stand 105 is also used to support the trailer 102. Also shown in FIG. 1 is a first hydraulic assembly 108. The apparatus includes a full load of bales 106, such as bales of stover discussed above. The bales 106 are secured by a series of securing members, such as straps 114. Also shown is a shaft or bar 116 to which the straps 114 are attached. As will be discussed in further detail hereinbelow, the bar 116 may be moved from a first side of the trailer to a second side of the trailer, thereby positioning the straps 114 over the bales 106 to secure the bales 106 for transport.

FIG. 2 depicts the apparatus 100 without a load of bales 106. Shown is the trailer 102, which includes a floor 118. It will be appreciated from FIG. 2, that the floor 118 may be composed of lateral members 120 and longitudinal members 126 which support the bales 106 rather than a solid floor. Any type of configuration may be considered a floor 118 without departing from the scope of the invention. The floor 118 includes a first side 122 and a second side 124, as well as a first end 123 and a second end 125.

In addition, the invention may include one or more movable side rails 128. The movable side rails 128 may be moved between open and closed positions. Referring to FIGS. 9A and 9B, the movement of the side rails 128 is shown. As shown in FIG. 9A, the side rails 128 may be folded in when the apparatus 100 is empty. Doing so may allow the empty apparatus 100 to be transported more easily and prevent the apparatus from 100 being too wide for some or all roads. Referring to FIG. 9B, the side rails 128 may be rotated outward to an open position. With the side rails 128 in the open position, the apparatus 100 may receive one or more bales 106 of material. Furthermore, as shown in FIGS. 2 and 9B, in the open position, the side rails 128 are at an angle to the floor 118, thus providing support to the bales 106 from the side of the bottom bales 106. In the case of round bales, this may be helpful in preventing rolling of the bales 106. The side rails may include longitudinal members 132 and lateral members 134.

Returning to FIG. 2, the apparatus 100 may include a first hydraulic assembly 108, a second hydraulic assembly 110, and a third hydraulic assembly 112. The hydraulic assemblies 108, 110, 112 may provide power to move the bar 116 from the floor 118 first side 122 to the floor 118 second side 124 and vice versa. The hydraulic assemblies 108, 110, and 112 will be discussed in further detail below. To that end, also shown is the bar 116, which is shown in its open position near the first side 122 of the floor 118.

As shown in FIGS. 1 and 2, the bar 116 may include a dispenser for dispensing and receiving the securing members. In the illustrated embodiment, the bar 116 includes a plurality of dispensers. Specifically, a plurality of rollers 130 is shown. In one embodiment, twelve rollers 130 and straps 114 may be used. FIG. 3 provides further detail of a roller 130. Shown is the bar 116 located next to a longitudinal floor member 126, as well as the floor 118 and a side rail 128. Specifically, a side rail longitudinal member 132 and lateral member 134 are shown. Also shown is a side rail connection 136. The side rail connection 136 is preferably configured to provide rotatable movement of the side rail 128, thus allowing movement of the side rail 128 between the open and closed position. In the illustrated embodiment, the rotatable movement is provided by a pin 138, about which the side rail lateral member 134 may rotate. Also shown is a hook member 140 which may be configured to lock and/or hold the bar 116 in place when it is in the closed and/or tightened positions.

Also shown is the roller 130 which is located on the bar 116. The securing member, or strap 114, may be dispensed and received from the roller 130. FIG. 3 shows the apparatus 100 in the closed position, meaning the bar 116 is located near the floor 118 second side 124 with the straps 114 securing the bales in place. Accordingly, the strap 114 is primarily in the dispensed position, although a portion of the strap 114 may still be wrapped around the roller 130.

Returning to FIGS. 1 and 2, the straps 114 are secured to the apparatus 100 on the underside of the trailer 102. Specifically, a first end 152 (shown in FIG. 5) of the strap 114 is attached to the underside of the trailer 102. The second end 154 of the strap 114 is connected to the roller 130. Turning to FIG. 4, the straps 114 are received by the rollers 130 on the bar 116 so that the straps 114 may be dispensed by the rollers 130 as the bar 116 is moved from the floor 118 first side 122 to the floor 118 second side 124, as will be discussed in further detail below. The straps may be permanently attached to the rollers by bolts 146. As will be understood by one of skill in the art, any type of connection may be used without departing from the scope of the invention. It is preferred that the connection is permanent, meaning that the user need not attach or detach the straps from the roller 130 during each use. Rather, the straps 114 remain attached to the roller 130, and the trailer 102 as discussed below, such that they may be automatically positioned when desired.

Turning to FIG. 5, the attachment of a strap 114 to the underside of the trailer 102 is shown in detail. A spool 142 may be connected to the underside of the trailer 102, such as to the longitudinal floor member 126. The strap 114 may be secured to the spool 142 via a permanent connection such as bolts 144. As will be understood by one of skill in the art, any type of connection may be used. It is preferred that the connection is permanent, meaning that the user need not attach or detach the straps from the apparatus 100 during each use. Rather, the straps 114 remain attached to the apparatus 100 such that they may be automatically positioned when desired. The spool may further include a pin 148. In some embodiments, the pin 148 may provide rotational movement of the spool 142, and specifically allow the strap 114 to be rolled and unrolled around the spool 142. The spool 142 may further include a ratchet assembly 150, which may allow the straps 114 to be rolled and unrolled from the spool 142. The ratchet assembly 150 may be manual, automated, or a combination of both without departing from the scope of the invention. The ratchet assembly 150, which will be discussed in further detail below, is one type of tightening means which may be employed by an apparatus 100 of the present invention.

Returning to FIG. 2, as discussed above, the bar 116 may be moved from a first side 122 of the floor to a second side of the floor 124. This movement may cause the rollers 130 to dispense the straps 114 laterally across the apparatus 100 and, therefore, across the bales 106 loaded on the apparatus 100. The movement of the bar 116 may be powered by one or more hydraulic assemblies. The preferred embodiment of the invention includes three hydraulic assemblies. Namely, a first hydraulic assembly 108 is located at the front of the apparatus, while a second hydraulic assembly 110 is located slightly forward of the center of the apparatus. Lastly, a third hydraulic assembly 112 is located just forward of the rear of the apparatus. In the preferred embodiment, the three hydraulic assemblies 108, 110, 112 are identical. Accordingly, only the first hydraulic assembly 108 will be discussed in detail. However, it will be understood by one of skill in the art that the apparatus 100 may include any number of hydraulic assemblies which may be identical or not, or varied from the configuration of the preferred embodiment disclosed herein, without departing from the scope of the invention. The movement of the three hydraulic assemblies 108, 110, 112 is preferably simultaneous or near simultaneous so that the entire length of the bar 116 moves together.

Turning to FIG. 6, the connection between the first hydraulic assembly 108 and bar 116 is shown. The bar 116 is resting near a longitudinal floor member 126, which is at an angle to a lateral floor member 120. The hydraulic assembly 108 includes a telescoping arm 156, which will be discussed in further detail below. The bar 116 is attached to the telescoping arm 156 by a bar coupling 158. The bar coupling 158 may be any type of coupling known in the art now or in the future which serves the function of securely connecting the bar 116 to the arm 156. Such a connection could include, but is not limited to, welding. In the illustrated embodiment, the arm 156 terminates at a coupling member 160. The coupling member 160 itself may be attached to the arm 156 by any method known in the art now or in the future, such as by welding or bolts. The coupling member 160 may be hollow, allowing it to receive the bar 116. The coupling member 160 shown in FIG. 6 is located on the first hydraulic assembly 108. As shown in FIG. 2, the first hydraulic assembly 108 is located at the front of the apparatus 100. As such, the bar 116 terminates at the coupling assembly 160. It will be understood by one of skill in the art that the second 110 and third 112 hydraulic assemblies may include coupling members 160 which allow the bar 116 to pass through and extend from both ends of the coupling member 160.

Turning to FIG. 7, a view of the first hydraulic assembly 108 of the preferred embodiment of the invention is shown. The assembly includes bottom support member 162, a first side support member 164, and a second side support member 166. The three support members 162, 164, 166 may form a triangle. Also included are a series of lateral supports 163 and longitudinal supports 165. Furthermore, two central supports 167, 169 extend upward from the bottom support member 162. Also included are the telescoping arm 156 and a hydraulic arm 168. The telescoping arm 156 may be powered by hydraulics and the hydraulic arm 168 may telescope. However, it will be appreciated that for ease of discussion, the two will be referred to as provided above.

The telescoping arm 156 and hydraulic arm 168 are connected via an arm connection 170. In the preferred embodiment, the arm connection 170 is a rotatable connection allowing the telescoping arm 156 and hydraulic arm 168 to rotate with respect to each other. In the preferred embodiment, the arm connection 170 includes a pin 172 which provides rotation between the two arms. Accordingly, the telescoping arm 156 is able to move the bar 116 from one side of the floor 118 to the other as it rotates about the pin 172 with respect to the hydraulic arm 168. Also shown is a hydraulic motor 174, which provides the power for the movement of the hydraulic arm 168 and, consequently, the movement of the telescoping arm 156.

Turning to FIG. 8, an elevation view of the hydraulic assembly 108 is provided. Shown is the bottom support member 162, first side member 164, and second side member 166 forming a triangle. Also shown are the lateral support 163 and longitudinal support 165, as well as a central support 167. The telescoping arm 156 and hydraulic arm 168 are also shown. The telescoping arm 156 may include a first end 182 and a second end 184. The telescoping arm 156 first end 182 may be connected to the hydraulic arm 168 via the arm connection 170. First 175 and second 177 telescoping arm supports are also provided on either side of the assembly 108. The telescoping arm supports 175, 177 support the telescoping arm 156 as it rests on either side of the assembly 108. Also shown is the arm connection 170 including the pin 172 about which the two arms 156, 168 rotate with respect to each other. The hydraulic motor 174 has been removed from this view. Attached to the second end 184 of the telescoping arm 156 is the bar 116.

As discussed above, the bar 116 may be moved from a position near the floor 118 first side 122 to the floor second side 124. In doing so, the bar 116 travels in an arcuate motion up and over the trailer 102, floor 118, and bales 106. In the illustrated embodiment, this motion is powered via at least one hydraulic motor 174 (shown in FIG. 7). The hydraulic motor 174 causes the hydraulic arm 168 to shorten and lengthen. Specifically, the hydraulic arm 168 includes a large cylinder portion 176 and a small cylinder portion 178. The large cylinder portion 176 receives the small cylinder portion 178. Accordingly, as the small cylinder portion 178 slides further into the large cylinder portion 176, the hydraulic arm 168 as a whole becomes shorter. Conversely, as the small cylinder portion 178 slides out of the large cylinder portion 176, the hydraulic arm 168 as a whole becomes longer. Furthermore, as mentioned above, the hydraulic arm 168 and telescoping arm 156 rotate with respect to each other about the arm connection pin 172. Also included in the assembly is telescoping arm pin 180. The telescoping arm pin 180 acts as a fulcrum about which the telescoping arm 156 may rotate or lever, as will be discussed in further detail below.

Turning to FIGS. 9A-9G, the operation of the apparatus 100 will be discussed in further detail. FIGS. 9A-9G, as well as the corresponding description below, will discuss various positions of the bar 116, straps 114, and side rails 128. Specifically the bar 116 may have an empty transport position, an open position, a closed position, and a tightened position. The straps 114, sometimes referred to as securing members, may include a storage position, a dispensed position, and a tightened position. The side rails 128 may include an empty transport position and an open position. It will be understood that the above-discussed components of the apparatus 100 may have any number of positions, including more or less than those described. The described positions are intended as illustrative and provided for ease of discussion only.

FIG. 9A is an elevation view of the bale strapping apparatus 100 in its empty transport state without a load of bales 106. The telescoping arm 156 is in a shortened state. Accordingly, the bar 116 is located slightly above the floor 118 first side 122. A strap 114 is shown which is connected to a spool 142 underneath the trailer 102. The telescoping arm 156 is resting on the first telescoping arm support 175. The telescoping arm 156 may be extended, thus moving the bar 116 into an open position, as shown in FIG. 8 by arrow A and FIG. 9B by arrow B. Furthermore, the side rail 128 is shown in FIG. 9A in its empty transport position. As discussed above, the side rail 128 may include longitudinal members 132 and lateral members 134. In the empty transport position, the side rail 128 is folded inward toward the middle of the trailer 102 floor 118. The side rail 128 may be moved to its open position, which is shown in FIG. 9B by arrows C and D. In the open position, the side rails 128 extend away and at an angle to the floor 118. The movement of the bar 116 and side rails 128 to their open position may be automated or manual. In a preferred embodiment, this movement occurs manually by the user. Specifically, the user may extend the telescoping arm 156 to lower the bar 116 into its open position. The user may then extend the side rail 128 into its open position. It will be noted that that the telescoping arm 156 may include a lock (not shown) to hold the telescoping arm 156 at its desired length. Such a lock may be any type known in the art, now or in the future, without departing from the scope of the invention. Accordingly, FIG. 9B shows both the bar 116 and side rails 128 in the open position. Referring to FIGS. 9A and 9B, the securing members, or straps 114, are shown in the storage position, meaning the majority of the strap 114 is wound around the roller 130.

Figure 9C:
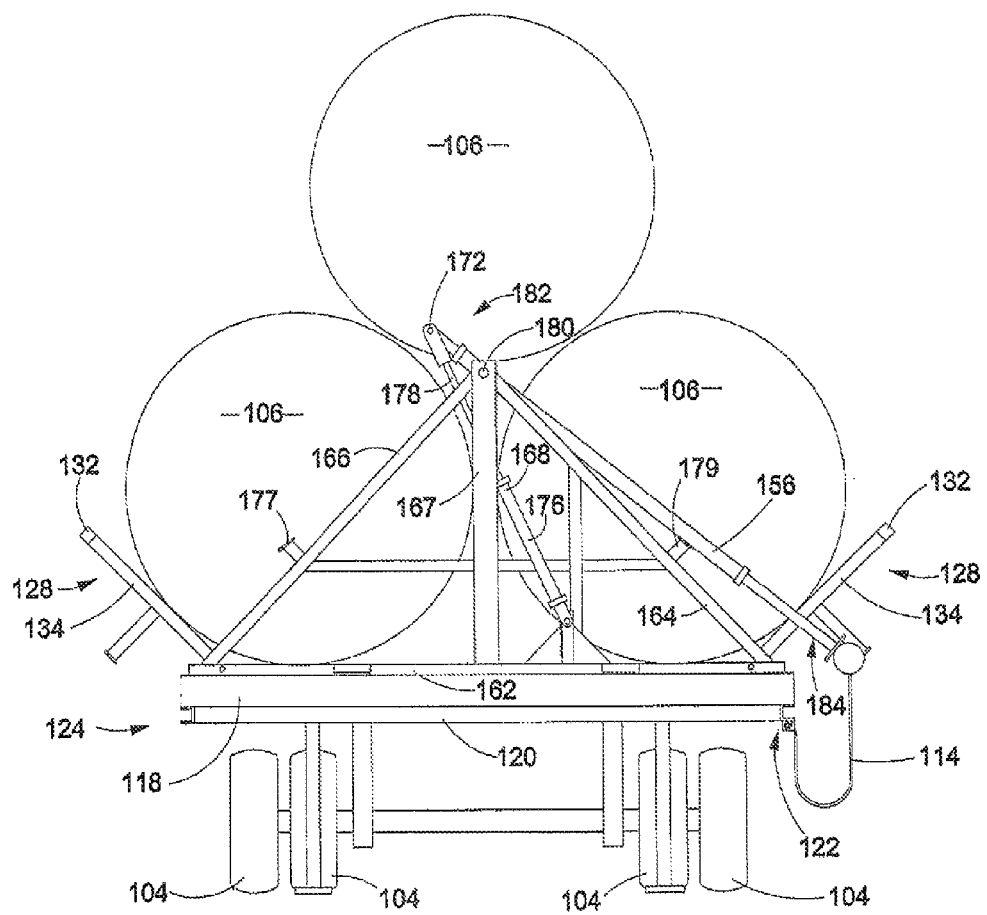
FIG. 9C is an elevation view of the bale strapping apparatus of FIG. 1 including a load of round bales wherein the self-strapping assembly and bar are in the open position.
Figure 9D:
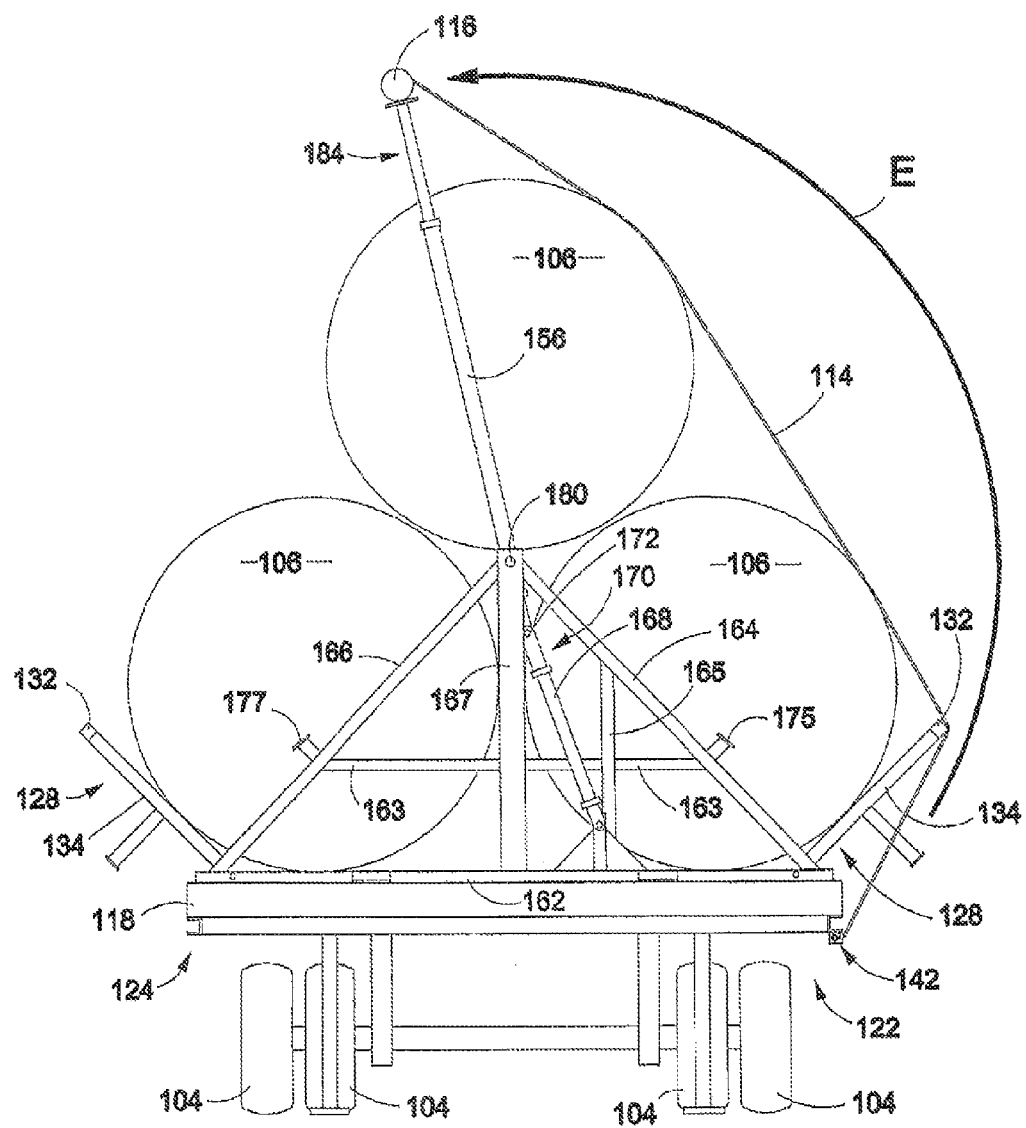
FIG. 9D is an elevation view of the bale strapping apparatus of FIG. 9C wherein the self-strapping assembly and bar are near a midpoint between the open and closed positions.

Returning to FIG. 9B, the apparatus 100 may be loaded with bales 106, such as with a forklift, tractor, manually, or any other method known in the art now or in the future. Turning to FIG. 9C, an elevation view of the apparatus 100 with a load of bales 106 is shown. The bales 106 are supported by the floor 118 and side rails 128. Specifically, the bales 106 may rest on the side rail 128 lateral members 134. The apparatus 100 may then be actuated to position the securing members over the bales 106. Referring to FIGS. 7, 8, and 9D, the hydraulic motor 174 (shown in FIG. 7), may be activated to begin the process. In one embodiment, a wired or wireless user control (not shown) may be activated by the user. This activation causes the hydraulic motor 174 to shorten the hydraulic arm 168. In particular, the hydraulic arm 168 large cylinder 176 receives the hydraulic arm 168 small cylinder 178. As the hydraulic arm 168 shortens, it pulls the first end 182 of the telescoping arm 156 downward via the arm connection pin 172 about which the hydraulic arm 168 and telescoping arm 156 rotate with respect to each other. This movement, in turn, cases the telescoping arm 156 to rotate about the telescoping arm pin 180. This movement causes the telescoping arm 156 second end 184 to move upward in an arcuate motion, as shown in FIG. 9D. In other words, the telescoping arm 156 acts as a lever, and the telescoping arm pin 180 is the fulcrum.

Moreover, as shown in FIG. 7, the hydraulic assembly 108 first side support member 164 includes a first aperture 186, while the second side support member 166 includes a second aperture 188. Therefore, as the hydraulic arm 168 and telescoping arm 156 rotate about each other and the telescoping arm pin 180, the two arms are received by the first aperture 186 and second aperture 188 as necessary. Referring to FIG. 9D, the hydraulic arm 168 is shown near its shortest state. The arm connection 170 and arm connection pin 172 have moved below the telescoping arm pin 180. Furthermore, the telescoping arm 156 second end 184 has moved just past the midpoint of the arcuate path shown by arrow E. At this point, in the preferred embodiment, the hydraulic motor 174 stops actuating movement of the arms 156, 168 and gravity begins causing the movement.

Figure 9E:
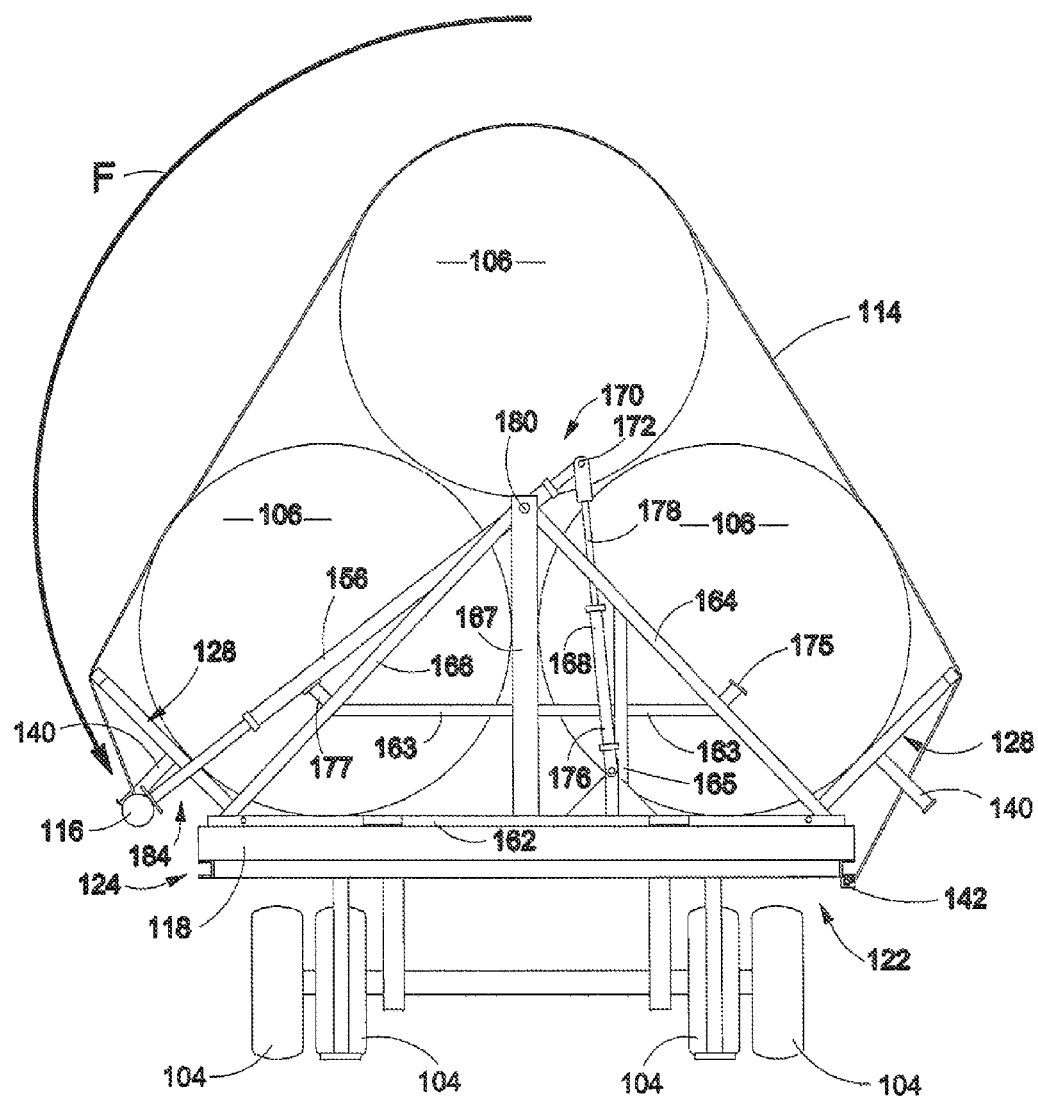
FIG. 9E is an elevation view of the bale strapping apparatus of FIG. 9D wherein the self-strapping assembly and bar are in the closed position.
Figure 9F:
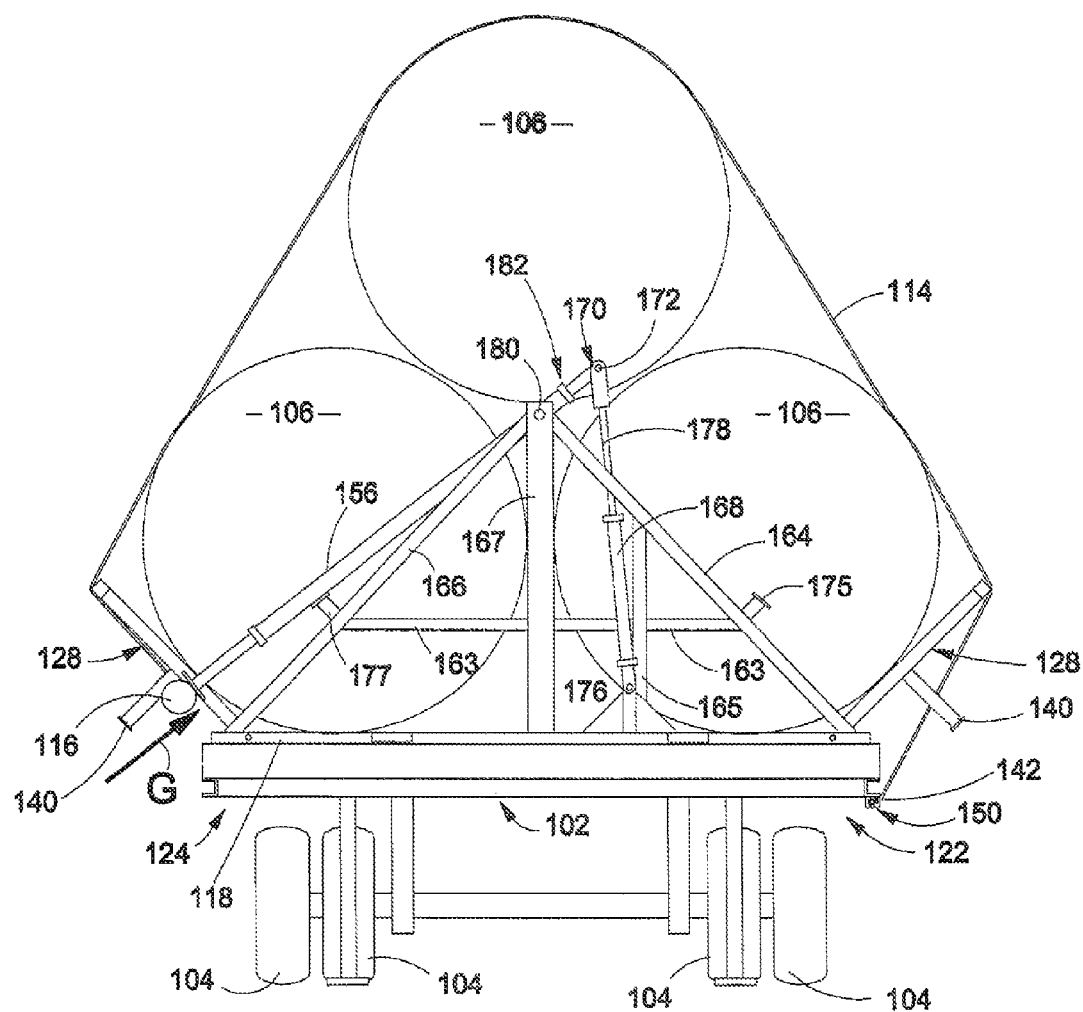
FIG. 9F is an elevation view of the bale strapping apparatus of FIG. 9E wherein the securing members and bar are in their tightened positions.

Referring to FIG. 9E, gravity pulls the telescoping arm 156 second end 184 downward to the position shown in FIG. 9E wherein the bar 116 is in the closed position. This movement of the bar 116 is shown by arrow F. As the telescoping arm 156 moves downward, it rotates or levers about the telescoping arm pin 180. This, in turn, drives rotation of the telescoping arm 156 and hydraulic arm 168 about each other via the arm connection 170 and pin 172. As the hydraulic arm 168 rotates about the pin 172, the hydraulic arm small cylinder 178 is pulled out of the hydraulic arm large cylinder 176, thus lengthening the hydraulic arm 168. Furthermore, this series of movements causes the hydraulic arm 168 to move from the second aperture 188 to the first aperture 186. Referring to the straps 114, the movement of the bar 116 from the open position shown in FIG. 9C to the closed position shown in FIG. 9E causes the strap 114 to be dispensed from the roller 130 (not shown in FIG. 9E). Specifically, the roller 130 is able to freely rotate about the bar 116 as the bar 116 moves to its closed position. Because the strap 114 is secured to the spool 142, the roller 130 automatically rotates as the bar 116 moves away from the spool 142. Therefore, the strap 114 is dispensed from the roller 130. Accordingly, FIG. 9E illustrates the bar 116 in its closed position and the strap 114, or securing member, in its dispensed position.

Figure 9G:
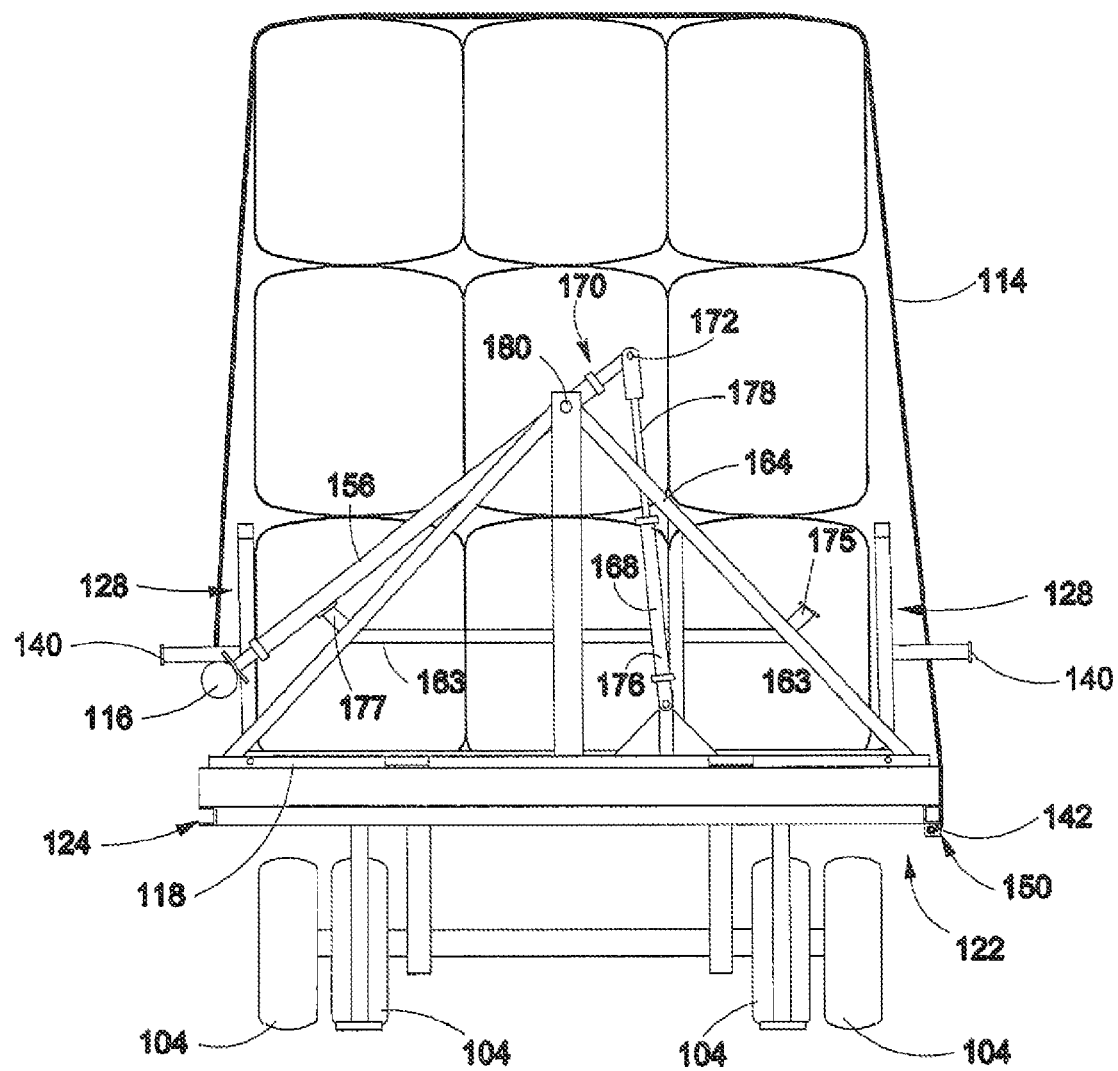
FIG. 9G is an elevation view of the bale strapping apparatus of FIG. 2 wherein the apparatus is securing square bales.

The apparatus 100 further includes at least one tightening means. In the preferred embodiment of the apparatus 100, multiple tightening means are included. First, the telescoping arm 156 may be employed to move the bar 116 from the closed position shown in FIG. 9E to the tightened position shown in FIG. 9F. In particular, the telescoping arm 156 may be shortened, thus moving the bar closer to the underside of the bales 106 and floor 118 second side 124. In this position, the bar is locked under the hook member 140. It will be understood that the apparatus 100 may include a number of hook members 140 located along the length of the apparatus 100 to tighten the bar 116 and hold and/or the bar 116 in place. This telescoping motion may be carried out manually, automatically, hydraulically, or by any other method or combination of methods. In the preferred embodiment, the telescoping arm 156 is manually shortened by a user. This movement is shown by arrow G. Again, as discussed above, a lock (not shown) may be used to hold the telescoping arm 156 at its appropriate length. Next, the bar 116 is actuated to spin such that the roller 130 receives the strap 114, or in other words winds the strap 114 around the roller 130, thereby tightening the strap 114 across the bales. This movement may be manual, automatic, or other. In the preferred embodiment, an electric motor is used to spin the bar 116. Specifically, an electric motor, such as a hoist motor, may be used to effect spinning of the bar 116. However, any type of motor, electric or otherwise, may be employed. Furthermore, in the preferred embodiment, the user actuates a control which causes the bar 116 to spin. Third, the user may manually tighten the strap 114 using the spool 142 ratchet assembly 150 shown in FIG. 5, which his located on the underside of the trailer 102 floor 118. Accordingly, both the straps 114 and bar 116 are in their tightened positions. The securing and tightening process may take ninety seconds or less, which is an improvement over manual methods of the prior art. Turning to FIG. 9G, the apparatus 100 is shown with large square or rectangular bales 106, which may also be secured and transported by the apparatus 100 of the present invention.

At this point, the bales 106 may be safely transported to a different location, such as by pulling the apparatus 100 with a semi-tractor. To unload the bales 106, it will be recognized that an opposite series of events may occur. First, the strap 114 may be loosened slightly if necessary. Next, the bar 116 may be moved from its tightened position to the closed position by adjusting the length of the telescoping arm 156 and, in particular, causing the telescoping arm 156 to become longer. The hydraulic motor 174 may then be activated to cause the hydraulic arm 176 to shorten, thereby pulling the telescoping arm 156 first end 182 downward. This causes the telescoping arm 156 second end 184 to rotate upward about the telescoping arm pin 180. As the hydraulic arm 168 is at or near its shortest state, the hydraulic motor 174 shuts off, and gravity again directs movement. Specifically, gravity pulls the bar 116 and telescoping arm 156 second end 184 downward. As the telescoping arm 156 rotates about the telescoping arm pin 180, the hydraulic arm 168 is lengthened and moved to the first side support member aperture 186. At this point, the bales 106 may be removed from the apparatus 100. Furthermore, the strap 114 may be received by the roller 130 by spinning the bar, such as via the electric motor discussed above. Once empty, the bar 116 may be moved to its transport position by shortening the telescoping arm 156. Further, the side rails 128 may be moved from the open position to the empty transport position. Alternatively, another load of bales 106 may be loaded on the apparatus 100 for transport.

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g. attached, adhered, joined) are to be construed broadly and may include intermediate members between a connection of elements and relative movement between elements. As such, joinder references do not necessarily infer that two elements are directly connected and in fixed relation to each other. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to the embodiments outlined above, various alternatives, modifications, variations, improvements and/or substantial equivalents, whether known or that are or may be presently foreseen, may become apparent to those having at least ordinary skill in the art. Listing the steps of a method in a certain order does not constitute any limitation on the order of the steps of the method. Accordingly, the embodiments of the invention set forth above are intended to be illustrative, not limiting. Persons skilled in the art will recognize that changes may be made in form and detail without departing from the spirit and scope of the invention. Therefore, the invention is intended to embrace all known or earlier developed alternatives, modifications, variations, improvements, and/or substantial equivalents.

The invention claimed is:

1. A bale strapping apparatus comprising:
   a trailer having a floor receiving at least one bale of material, said floor having first and second ends and first and second sides;
   a self-strapping assembly comprising a bar having a plurality of dispensers, said plurality of dispensers each dispensing a securing member, said securing members each permanently attached to a respective on of said dispenser dispensing said securing member; and
   means for moving said bar from an open position to a closed position, wherein said bar is near said first floor side in said open position and said bar is near said second floor side in said closed position and wherein said plurality of securing members are in a dispensed position in said closed bar position.

2. The bale strapping apparatus of claim 1 further comprising at least one tightening means.

3. The bale strapping apparatus of claim 2 wherein said plurality of securing members further includes a storage position wherein said securing members are not dispensed and a tightened position.

4. The bale strapping apparatus of claim 2 wherein said tightening means activates said securing members to move between said dispensed position and said tightened position, said tightened position securing said bale on said trailer.

5. The bale strapping apparatus of claim 4 wherein said tightening means comprises at least one telescoping member for moving said bar.

6. The bale strapping apparatus of claim 5 further comprising means for activating said dispensers to receive said securing members, thus moving said securing members between said dispensed and said tightened positions.

7. The bale strapping apparatus of claim 6 further comprising at least one hook member for securing said bar in said closed position.

8. A bale strapping apparatus comprising:
   a trailer having a floor, said floor having first and second ends and first and second sides, said floor further having a longitudinal direction extending between said first and second ends and a lateral direction extending between said first and second sides;
   said floor receiving at least one bale of material;
   a self-strapping assembly comprising a bar having a plurality of rollers, said plurality of rollers dispensing a plurality of straps, said straps each permanently attached to a respective one of said roller dispensing said strap;
   means for moving said bar from said floor first side to said floor second side, said plurality of rollers dispensing said plurality of straps as said bar moves from said floor first side to said floor second side, thereby positioning said straps across said floor lateral direction;
   said means for moving said bar comprising at least one motor for activating movement; and
   at least one tightening means for tightening said straps, thereby securing said at least one bale of material on said trailer.

* * * * *